United States Patent [19]

Matsuno

[11] Patent Number: 5,742,917
[45] Date of Patent: Apr. 21, 1998

[54] DRIVING TORQUE DISTRIBUTION CONTROL SYSTEM FOR VEHICLE AND THE METHOD THEREOF

[75] Inventor: Koji Matsuno, Kasakake, Japan

[73] Assignee: Fuji Jukogyo Kabushiki Kaisha, Tokyo, Japan

[21] Appl. No.: 489,785

[22] Filed: Jun. 13, 1995

[30] Foreign Application Priority Data

Jun. 27, 1994 [JP] Japan ................................. 6-144656

[51] Int. Cl.$^6$ .................................................. B60K 17/34
[52] U.S. Cl. .......................... 701/69; 701/88; 701/89; 180/197
[58] Field of Search ................. 364/426.029, 426.033, 364/424.098, 426.027, 426.034, 426.035; 180/197

[56] References Cited

U.S. PATENT DOCUMENTS

| | | |
|---|---|---|
| 4,936,406 | 6/1990 | Tezuka et al. ................ 180/249 |
| 4,966,250 | 10/1990 | Imaseki ............................ 180/233 |
| 5,259,476 | 11/1993 | Matsuno et al. ................ 180/197 |
| 5,262,950 | 11/1993 | Nakayama ................... 364/424.05 |
| 5,417,298 | 5/1995 | Shibahata ........................ 180/76 |
| 5,450,919 | 9/1995 | Shitani ............................. 180/233 |

FOREIGN PATENT DOCUMENTS

63-13824  1/1988  Japan.

*Primary Examiner*—Michael Zanelli
*Attorney, Agent, or Firm*—Martin A. Farber

[57] ABSTRACT

In a torque distribution control system of a four wheel drive vehicle, it is important to distribute a driving force properly between front and rear wheels according to friction coefficient of road surface. Especially when a vehicle runs on roads with low friction coefficients of road surface, it is very important to estimate friction coefficients of the road surface which vary every moment and to control the driving force according to the estimated friction coefficients. The present invention provides the torque distribution control system with means for estimating friction coefficients of road surface every moment based on data from a steering angle sensor, a vehicle speed sensor and a yaw rate sensor and for reflecting them on the calculation of torque distribution between front and rear wheels. Furthermore, yaw moment calculating means are provided to prevent the vehicle from tack-in phenomenon by properly controlling left and right wheels.

26 Claims, 7 Drawing Sheets

DRIVING TORQUE DISTRIBUTION CONTROL SYSTEM FOR VEHICLE AND THE METHOD THEREOF

BACKGROUND OF THE INVENTION

1. Field of the Invention

The present invention relates to a control system for variably controlling a driving torque distribution between front and rear wheels of a vehicle or between a rear-left and rear-right wheel thereof and more specifically to a control system for controlling a driving torque distribution based on calculations using vehicular parameters such as engine output torque, vehicle speed, a steering angle, a yaw rate and others.

2. Description of the Prior Art

It is well known that a vehicle exhibits a running behavior unique to its driving system, such as a front engine-rear drive (FR) system and a front engine-front drive (FF) system. Further it is known that a full-time four wheel drive vehicle equipped with a center differential can be improved in marginal performance of the vehicle when brakes are applied abruptly thereto or when it turns a corner, compared to ordinal FR or FF vehicles. Recently, four wheel drive vehicles of this type are becoming popular since they have a medium steering characteristic between over-steer and under-steer and therefore it is said that the four wheel drive vehicles with center differential are easy to operate.

As an example of the torque distribution control system between front and rear wheels of a four-wheel drive vehicle having a center differential, there is a Japanese Unexamined Patent Application No. Toku-Kai-Sho 63-13824 in which a lateral acceleration during cornering is detected and a differential limiting torque is generated according to the magnitude of the lateral acceleration in a hydraulic multidisc clutch, thereby the torque distribution between front and rear wheels is controlled so as not to cause a spin or drift-out during cornering.

Other examples of a similar technique are found in Japanese Unexamined Patent Applications, No. Toku-Kai-Sho 61-229616 and No. Toku-Kai-Hei 3-74221. The former patent discloses a technique in which the torque distribution between front and rear wheels or between left and right wheels is variably controlled by detecting spin or drift-out based on the difference between a target yaw rate calculated from steering angle and vehicle speed and an actual yaw rate. The latter one discloses a technique in which the torque distribution between front and rear wheels or between left and right wheels is variably controlled by calculating a variation versus time of the steering characteristic from a steering angle, vehicle speed and actual yaw rate.

However, in the abovementioned prior techniques, for example in Toku-Kai-Sho 63-13824, since the state of turning is detected only by lateral acceleration, the controllable range is limited to a so-called linear grip region where lateral force varies proportionally with respect to a tire slip angle. That is to say, when the vehicle runs on a road with low friction coefficient and enters into such a marginal state that the gripping force of the tires reach a limit and the vehicle starts to spin, the lateral force varies in a non-linear manner and the actual lateral acceleration arbitrarily according to the vehicle behavior in a spinning state. As a result the state of turning of the vehicle can not be accurately determined. Further, in the prior art disclosed in Toku-Kai-Sho 61-229616 and Toku-Kai-Hei 3-74221, since the state of turning of the vehicle is determined by a signal from a yaw rate sensor, it is expected that the vehicle behavior can be judged more accurately than that of Toku-Kai-Sho 63-13824. However the above-mentioned prior art is still insufficient in the control in the marginal state.

SUMMARY OF THE INVENTION

Accordingly, the present invention is intended to obviate the aforementioned defects and disadvantages of the prior art.

It is an object of the present invention to provide a driving torque distribution control system capable of properly controlling the torque distribution among wheels of a vehicle so as to propel the vehicle with a good stability under any running condition ranging from a straight ahead running to a cornering and under any road condition ranging from a road with high friction coefficient to a road with low friction coefficient.

In order to achieve this object, the present invention has newly introduced road friction estimating means into the torque distribution control mechanism. That is to say, according to prior art, in the control parameters of the torque distribution control systems, the factor of friction coefficient between tire and road surface has not been included or if any the friction coefficient has been introduced only as a fixed value or a constant. On the other hand, according to the present invention the friction coefficients are estimated every moment based on miscellaneous detected vehicle data in the control unit itself and thus estimated friction coefficients are employed as primarily important control variables for determining torque distribution ratios corresponding to running and road conditions. Because of this feature, since the torque distribution control system according to the present invention estimates friction coefficients of road surface ranging from a high friction coefficient road to a low friction coefficient road, the vehicle can be operated safely and comfortably in a wide variety of road conditions.

One driving torque distribution control system according to the present invention comprises:

an engine speed sensor for detecting an engine speed;

an accelerator pedal opening angle sensor for detecting an accelerator pedal opening angle;

a gear position sensor for detecting a gear position;

a steering angle sensor for detecting a steering angle;

a vehicle speed sensor for detecting a vehicle speed;

a yaw rate sensor for detecting a yaw rate of the vehicle;

input torque estimating means for estimating an input torque based on the engine speed, the accelerator pedal angle and the gear position;

target yaw rate determining means for determining a target yaw rate based on the steering angle and the vehicle speed;

yaw rate gain determining means for determining a yaw rate gain based on the vehicle speed;

target steering characteristic determining means for determining a target stability factor based on the target yaw rate, the yaw rate, the vehicle speed and the yaw rate gain;

road friction estimating means for estimating a friction coefficient of road surface based on the steering angle, the vehicle speed and the yaw rate; and torque distribution ratio calculating means for calculating a torque distribution ratio based on the input torque, the target stability factor, the vehicle speed, the yaw rate and the friction coefficient.

DETAILED DESCRIPTION OF THE PREFERRED EMBODIMENT

Figure 2:
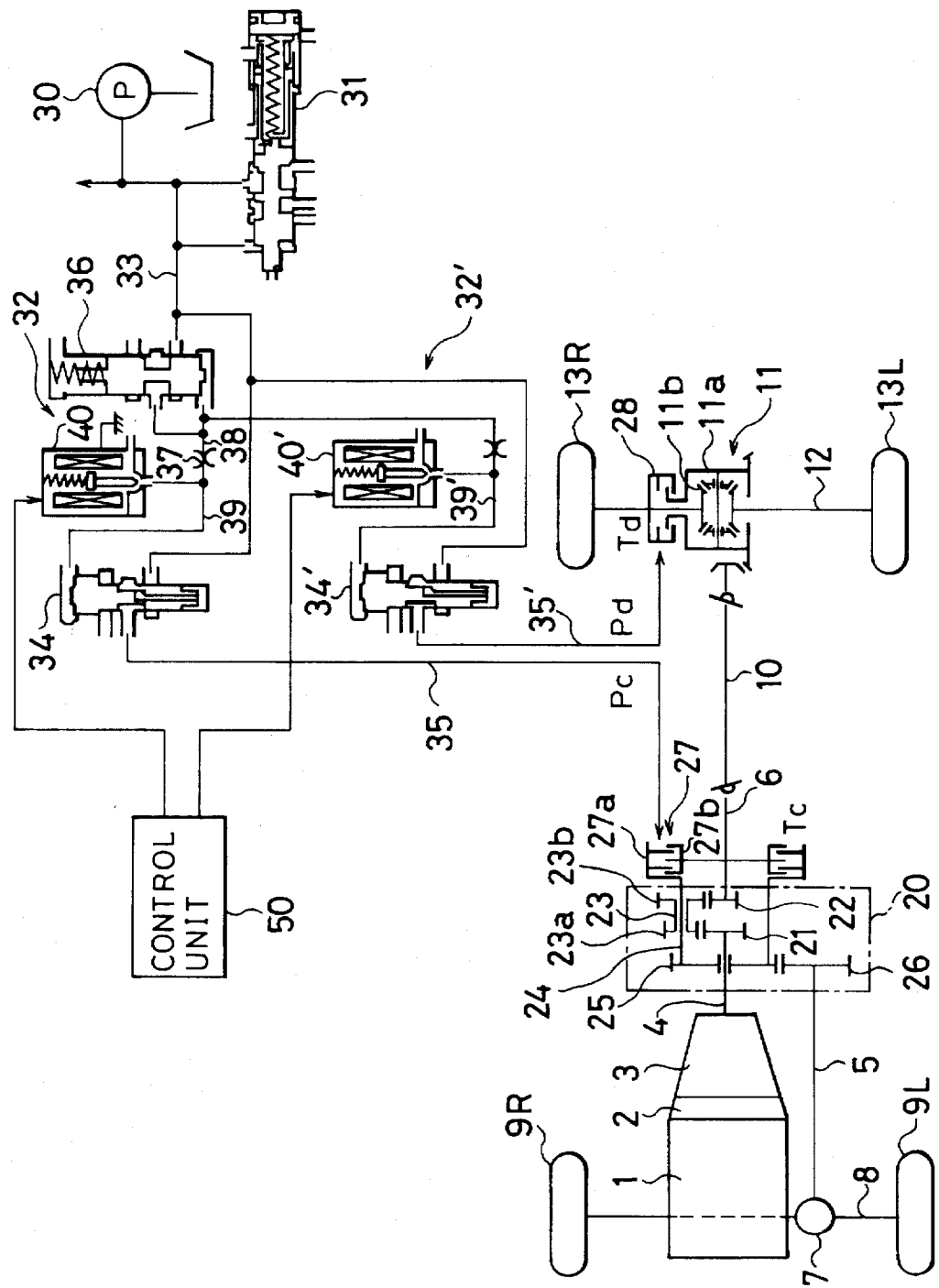
FIG. 2 is a diagram showing a drive train of a four-wheel drive vehicle and a hydraulic control system thereof according to the present invention.

Referring now to FIG. 2, an outline of the construction of a power train for a four-wheel drive vehicle capable of controlling a torque distribution between front and rear wheels and between left and right wheels will be described hereinafter.

Numeral 1 denotes an engine, numeral 2 denotes clutch, numeral 3 denotes a transmission, numeral 4 denotes an output shaft of the transmission 3 and numeral 20 denotes a center differential. The output shaft 4 of the transmission 3 connects the transmission 3 and the center differential 20. The center differential 20 is connected through a front drive shaft 5 to a front differential 7 which drives a front-left wheel 9L and a front-right wheel 9R through a drive axle 8. Further, a rear drive shaft 6 and a propeller shaft 10 connect the center differential 20 and a rear differential 11 which drives a rear-left wheel 13L and a rear-right wheel 13R through a drive axle 12.

The rear differential 11 is composed of bevel gears and in this embodiment, a hydraulic type multiple disc rear clutch 28 as differential limiting means is provided between a differential case 11a and a side gear 11b of the rear differential 11. In case where a rear differential limiting torque of the rear clutch 28 is zero, the torque is equally distributed to the rear-left wheel 13L and the rear-right wheel 13R and in the case where the rear differential limiting torque is produced and becomes a value Td, the torque is shifted by the amount of the value Td from a high speed wheel to a low speed wheel and when a differential lock is engaged at the maximum value of the differential limiting torque Td, the torque is distributed to the two wheels 13L, 13R according to a product W·µ of a load W applied to the rear-left wheel 13L and the rear-right wheel 13R respectively and of a friction coefficient µ of the road surface.

The center differential 20 is composed of compound type planetary gears and it comprises: a first sun gear 21 fixed to the output shaft 4 of the transmission 3, a second sun gear 22 fixed to the rear drive shaft 6, a plurality of pinion shafts 23 arranged around these sun gears 21, 22, a first pinion 23a fixed to the pinion shaft 23 and meshing with the first sun gear 21, and a second pinion 23b fixed to the pinion shaft 23 and meshing with the second sun gear 22. Further, it comprises: a drive gear 25 rotatably mounted on the output shaft 4, a carrier 24 fixed to the drive gear 25 and rotatably connected to the pinion shaft 23 and a driven gear 26 fixed to the front drive shaft 5 and meshing with the drive gear 25. In the center differential thus constituted, the torque inputted to the first sun gear 21 is divided into the carrier 24 and the second sun gear 22 in a predetermined reference torque distribution ratio and the rotational difference generated between front and rear shafts when the vehicle turns a corner is absorbed by the planetary rotation of the pinion shaft 23. The reference torque distribution ratio can be determined at a desired value by the selection of the intermeshing pitch circles of the sun gears 21, 22 and the pinions 23a, 23b. Where et is the reference torque distribution ratio, TF is the front wheel torque and TR is the rear wheel torque, it is possible to establish the reference torque distribution ratio et as follows for example:

$$TF:TR=34:66 \qquad \text{(Formula 1)}$$

In this case, it is understood that the torque distribution ratio has been set so as to apply a larger torque to the rear wheels than the front ones.

Further, a center clutch 27 of the hydraulic multiple friction disc type is disposed at the direct rear of the center differential 20. The center clutch 27 comprises a drum 27a coaxially fixed to the carrier 24 and a hub 27b coaxially fixed to the rear drive shaft 6. By controlling the center clutch 27 a differential limiting torque Tc is produced so as to limit the differential operation of the center differential 20 and further it becomes possible to transfer the torque from the rear to front wheels as well as from the front to rear wheels.

In case of a front-engine, where WF denotes a front wheel weight, WR denotes a rear wheel weight and ew a static weight distribution ratio between the front wheel weight WF and the rear wheel weight WR, assuming ew as follows;

$$WF:WR=62:38 \qquad \text{(Formula 2)}$$

If the center clutch is fully engaged and the friction coefficients of the front and rear wheels against the road surface are equal to each other, the torque is distributed between the front and rear wheels at the ratio expressed in the formula (2). On the other hand, since the torque can be distributed also at the ratio expressed in the formula (1), the torque distribution ratio can be controlled widely between (1) and (2) according to the differential limiting torque Tc of the center clutch 27.

Next, the hydraulic control system for controlling the center clutch 27 and the rear clutch 28 will be described.

Center clutch hydraulic control means comprise a hydraulic pump 30 for generating hydraulic pressure, a pressure regulator 31 for regulating hydraulic pressure, a hydraulic passage 33, a pilot valve 36 for further regulating hydraulic pressure, a hydraulic passage 38, an orifice 37, a duty solenoid valve 40 for producing a duty pressure Pd and a clutch control valve 34 for operating the center clutch 27 according to the duty pressure Pd. That is to say, the differential limiting torque Tc is variably controlled according to the magnitude of the duty pressure Pd.

On the other hand, rear clutch hydraulic control means 32' comprise a duty solenoid valve 40' for producing a duty pressure Pd and a clutch control valve 34' in addition to the hydraulic pump 31, the pilot valve 36 and others which are shared with clutch hydraulic control means. The differential limiting torque Td of the rear clutch 28 is variably controlled according to the duty pressure Pd in the same way as in the aforementioned center clutch control means.

Next, the control of the torque distribution control system will be described. First, the torque distribution control between front and rear wheels will be described hereinafter.

When the tire characteristic is in a linear region, the cornering powers of the front and rear wheels are constant but when the vehicle shows a marginal behavior such as "spin" due to a lost grip of tire while the vehicle turns a corner with acceleration on a road having a low friction coefficient, the tire lateral force is lowered. The present invention is based on an idea that it is possible to estimate friction coefficients of the road surface by treating the lowering of tire lateral force as the lowering of cornering power. Furthermore, based on this idea it is possible to analyze the equation of vehicular motion extended to a non-linear region of the tire characteristic when the vehicle runs on a low friction coefficient road.

According to the theory of friction circle, it is known that the tire lateral force is affected by the driving force and that the stability of the vehicle at the non-linear slip region can be judged from the stability factor of steering characteristic.

Thus, according to the present invention, first a friction coefficient of road surface is estimated by obtaining a cornering power of front and rear wheels in the non-linear region based on miscellaneous parameters and a critical behavior of the vehicle is expressed numerically by use of the stability factor. Further, characteristics of vehicular motion in the linear region can be accurately grasped by analyzing equations of vehicular motion based on driving force, running conditions, friction coefficient of road surface and stability factor. Hence, it is possible to improve the stability of the vehicle, such as preventing the vehicle from spinning, by controlling torque distribution between front and rear wheels so as to always obtain a constant stability factor.

Consequently, it is important to obtain the cornering power of the front and rear wheels in the non-linear region based on miscellaneous parameters and to estimate a friction coefficient of road surface based on the cornering power. The cornering power can be obtained from a steering angle, vehicle speed and the actual yaw rate. As a method of estimating a friction coefficient of road surface, there is a method in which, for example, the cornering power is estimated by comparing the yaw rate calculated from the equation of vehicular motion with the actual yaw rate on an on-line base. Specifically, the cornering power is calculated by the method of parameter adjustment according to an adaptive control theory which will be described hereinafter.

Figure 3:
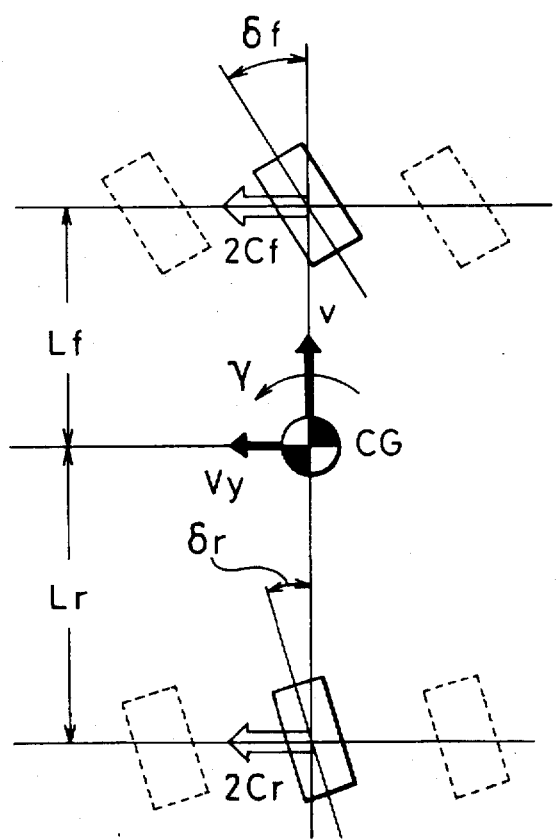
FIG. 3 is a diagram showing a two-wheel vehicle model in a lateral motion.

First, an equation of vehicular lateral motion is produced using a vehicular motion model as illustrated in FIG. 3. The equation is expressed as:

$$2Cf + 2Cr = M \cdot Gy \qquad \text{(Formula 3)}$$

where $Cf$, $Cr$ is a cornering force of the left and right wheels respectively, $M$ is a vehicle weight and $Gy$ is a lateral acceleration.

On the other hand, an equation of vehicular motion around the center of gravity is expressed as:

$$2Cf \cdot Lf - 2Cr \cdot Lr = Iz \cdot \dot{\gamma} \qquad \text{(Formula 4)}$$

where $Lf$, $Lr$ is a distance from the center of gravity to the front and rear wheels respectively, $Iz$ is a yaw moment of inertia of the vehicle and $\gamma$ is a yaw rate.

A lateral acceleration $Gy$ is expressed as:

$$Gy = \dot{V}y + V \cdot \gamma \qquad \text{(Formula 5)}$$

where $V$ is a vehicle speed and $Vy$ is a lateral slip velocity.

Further, although the cornering forces $Cf$, $Cr$ have a response like a first-order time lag, if this time lag is neglected, the cornering forces $Cf$, $Cr$ are expressed as:

$$Cf = Kf \cdot \alpha f, \quad Cr = Kr \cdot \alpha r \qquad \text{(Formula 6)}$$

where $Kf$, $Kr$ is a cornering power of the front and rear wheels respectively and $\alpha f$, $\alpha r$ is a lateral slip angle of the front and rear wheels respectively.

On the other hand, when an idea of an equivalent cornering power is introduced in consideration of the effects of the rolling of the vehicle or the suspension system, the lateral slip angles $\alpha f$, $\alpha r$ are expressed as:

(Formula 7)

$$\alpha f = \frac{\delta f}{n} - \frac{Vy + Lf \cdot \gamma}{V}$$

$$\alpha r = \delta r - \frac{Vy - Lr \cdot \gamma}{V}$$

where $\delta f$, $\delta r$ is a steering angle of front and rear wheels respectively and $n$ is a steering gear ratio.

The abovementioned equations (Formula 3 through Formula 7) are fundamental equations of motion.

Miscellaneous parameters are estimated by expressing these equations as variables of state and applying a parameter adjusting method to the adaptive control theory. The cornering power is obtained from the parameters thus estimated. With respect to the parameters of an actual vehicle, there are vehicle weight, yaw moment of inertia and the like. In developing the theory, these vehicular parameters are assumed to be constant and only the cornering power is assumed to be variable. The cornering power of the tire varies according to a non-linerity of the lateral force against the slip angle, an effect of the friction coefficient of road surface, an effect of the weight transfer and the like. Where $a$ is a parameter estimated by the change of the yaw rate $\gamma$ and $b$ is a parameter estimated by the front wheel steering angle $\delta f$, the cornering power of the front and rear wheels $Kf$, $Kr$ are expressed as follows, for example:

$$Kf = b \cdot Iz \cdot n / 2Lf \qquad \text{(Formula 8)}$$

$$Kr = (a \cdot Iz + Lf \cdot Kf) / Lr$$

The cornering power of the front and rear wheels $Kf$, $Kr$ in the non-linear region are estimated by substituting the vehicle speed $V$, the steering angle $\delta f$ and the yaw rate $\gamma$ into the aforementioned formulas. Further, by comparing the cornering powers $Kf$, $Kr$ thus estimated with those on a high friction coefficient road surface for each front and rear tire in the following manner for example, a friction coefficient $\mu$ of the road surface is calculated and further based on the calculated friction coefficient $\mu$ an estimated friction coefficient E in the non-linear region is determined with high accuracy.

$$\mu f = Kf / Kf0 \qquad \text{(Formula 9)}$$

$$\mu r = Kr / Kf0$$

where $\mu f$, $\mu r$ is a friction coefficient of the front and rear wheels respectively, $Kf$, $Kr$ is an estimated cornering power of the front and rear wheels respectively, and $Kf0$, $Kr0$ is an equivalent cornering power on the high friction coefficient road of the front and rear wheels respectively. Here, the equivalent cornering powers $Kf0$, $Kr0$ are friction coefficients given by correcting the tire characteristic assumed to produce a cornering force in proportion to the slip angle within a region where a tire slip angle is very small by characteristics of suspension and others.

Figure 5:
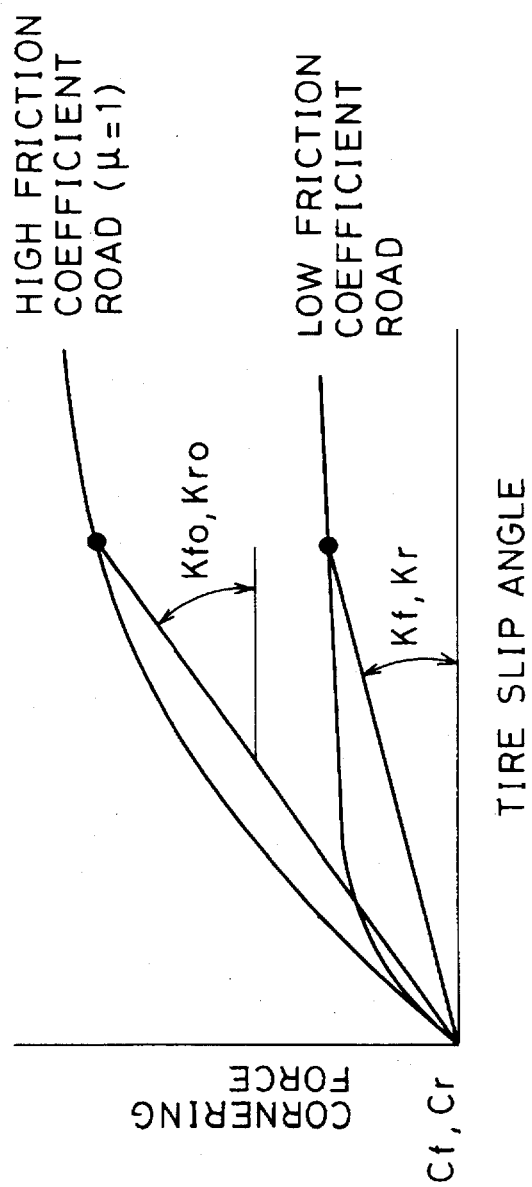
FIG. 5 is a graph diagram showing the relationship between the cornering power and the tire slip angle.

The above equations are understood as follows:

When the vehicle operates on a high friction coefficient road with a full grip of tire, since both the front and rear wheels are employed in the linear region of tire characteristic, the estimated cornering powers Kf, Kr can be considered to be equal to the equivalent cornering powers KfO, KrO respectively and consequently the friction coefficients μs are estimated to be 1.0. Further, when the vehicle is drifting out, the slip angle of the front wheel becomes very large and accordingly, as shown in FIG. 5, it is estimated that the estimated cornering power Kf=cornering force of front wheel/slip angle of front wheel becomes extremely small. Similarly, when the vehicle is spinning, the estimated cornering power Kr=cornering force of rear wheel/slip angle of rear wheel becomes extremely small. To avoid this problem, the larger one of the estimated friction coefficients for the front and rear wheels is allowed to be established as an estimated friction coefficient of the road surface "E".

Next, a case where the torque is distributed between the front and rear wheels will be described.

The equations of motion of a vehicle can be analyzed by extending them to the non-linear region using the vehicle speed V, the yaw rate γ, the input torque Ti, the target stability factor At, the estimated friction coefficient E of road surface and others. The torque distribution ratio α between the front and rear wheels is calculated according to the following equations of motion of the vehicle.

(Formula 10)

$$\alpha = \frac{-b + \sqrt{b^2 - ac}}{a}$$

In this case, α should be
$0 \leq \alpha \leq 1$.
If $\alpha > 1$, α is let to be 1 and
if $\alpha < 0$, α is let to be 0.
$Gx' = (Ti \cdot Gt/Rt)(W/g)$
$Gy' = V \cdot \gamma$ (Formula 11)

$$a = \left\{ -\frac{Lf \cdot L^2}{2Lr^2} \left( Kfo - \frac{Kfc \cdot W \cdot Gx' \cdot h}{2gL} \right) + \frac{Lr \cdot L^2}{2Lf^2} \left( Kro + \frac{Krc \cdot W \cdot Gx' \cdot h}{2gL} \right) \right\} \frac{(Gx')^2 Gy'}{g^3 E^3}$$

$$b = -\frac{Lr \cdot L^2}{2Lf^2} \left( Kro + \frac{Krc \cdot W \cdot Gx' \cdot h}{2gL} \right) \frac{(Gx')^2 Gy'}{g^3 E^3}$$

(Formula 12)

$$c = 2Lf \left( Kfo - \frac{Kfc \cdot W \cdot Gx' \cdot h}{2gL} \right) \left\{ 1 - \frac{Gy'}{2gE} \left( 1 + \frac{h \cdot Gx'}{Lr \cdot g} - \frac{h^2}{2Lr^2} \left( \frac{Gx'}{g} \right)^2 \right) \right\} -$$

$$2Lr \left( Kro + \frac{Krc \cdot W \cdot Gx' \cdot h}{2gL} \right) \left[ 1 - \frac{Gy'}{2gE} \left\{ 1 - \frac{h \cdot Gx'}{Lf \cdot g} - \frac{1}{2} \left( \frac{h^2}{Lf^2} - \frac{L^2}{E^2 Lf^2} \right) \left( \frac{Gx'}{g} \right)^2 \right\} \right] + A_t \cdot \frac{g \cdot L^2}{W} \cdot \frac{\partial Yf}{\partial \beta f} \cdot \frac{\partial Yr}{\partial \beta r}$$

(Formula 13)

$$\frac{\partial Yf}{\partial \beta f} = 2 \left( Kfp - \frac{Kfc \cdot W \cdot Gx' \cdot h}{2gL} \right) \left[ 1 - \frac{Gy'}{2gE} \left\{ 1 + \frac{h \cdot Gx'}{Lr \cdot g} - \frac{1}{2} \left( \frac{h^2}{Lr^2} - \frac{L^2}{4E^2 Lr^2} \right) \left( \frac{Gx'}{g} \right)^2 \right\} \right]$$

(Formula 14)

$$\frac{\partial Yr}{\partial \beta r} = 2 \left( Kro + \frac{Krc \cdot W \cdot Gx' \cdot h}{2gL} \right) \left[ 1 - \frac{Gy'}{2gE} \left\{ 1 - \frac{h \cdot Gx'}{Lf \cdot g} - \frac{1}{2} \left( \frac{h^2}{Lf^2} - \frac{L^2}{4E^2 Lf^2} \right) \left( \frac{Gx'}{g} \right)^2 \right\} \right]$$

(Formula 15)

$$A_t = A_{to} - \left( \frac{\delta f}{G_\gamma \delta_f + \Delta \gamma} - \frac{1}{G_\gamma} \right) / (LV)$$

$$G_\gamma = \left( \frac{1}{1 - \frac{W}{2L^2} \cdot \frac{L_f K_f - L_r K_r}{K_f K_r}} \right) V/L$$

where Gx' is an estimated longitudinal acceleration, Gy' is an estimated lateral acceleration, W is a vehicle weight, θ is a height of a center of gravity, L is a wheel base, Lf is a distance between the center of gravity and the front wheel, Lr is a distance between the center of gravity and the rear wheel, Kf0, Kr0 is an equivalent cornering power of the front and rear wheels in the linear region respectively, Kfc, Krc is a weight dependency of cornering power subjected to partial differential of Kf, Kr by the load of ground contact, Gt is a final gear ratio, Rt is a tire diameter, Ti is an input torque, At is a target stability factor, At0 is a reference target stability factor (a predetermined constant, set at weak understeer), df is a steering angle of front wheel, Gγ is a yaw rate gain, Δγ is a deviation between actual yaw rate and target yaw rate, and V is a vehicle speed.

Figure 1:
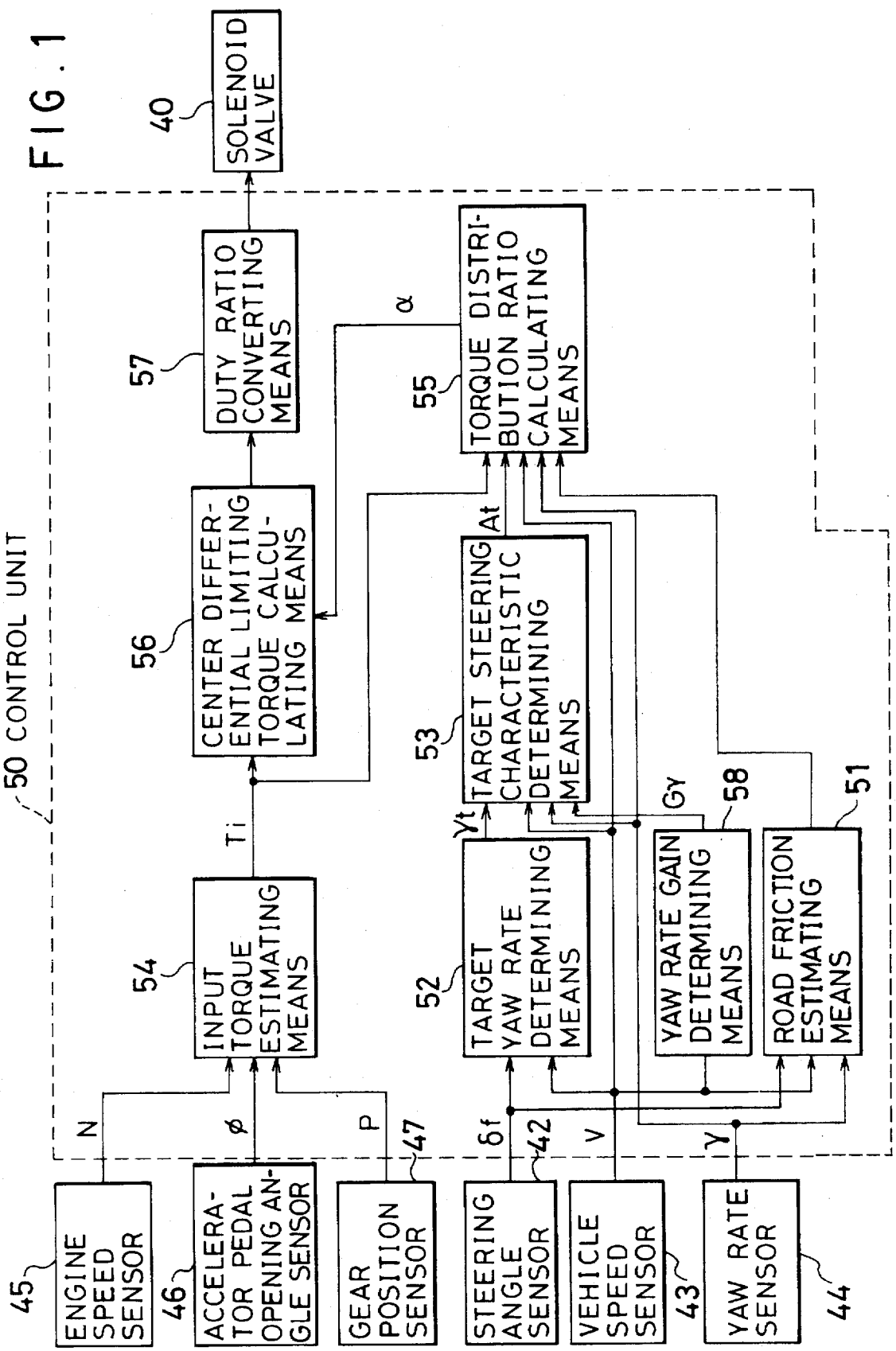
FIG. 1 is a block diagram showing means constituting a torque distribution control system between front and rear wheels of a vehicle according to the present invention.

Based on the aforementioned equations, the control system shown in FIG. 1 will be described hereinafter.

Miscellaneous data, a steering angle δf detected by a steering angle sensor 42, a vehicle speed V detected by a vehicle speed sensor 43, a yaw rate γ detected by a yaw rate sensor 44, an engine speed N detected by an engine speed sensor 45, an accelerator pedal angle φ detected by an accelerator pedal angle sensor 46 and a gear position P detected by a gear position sensor 47 are inputted to the control unit 50.

In friction coefficients estimating means 51, the cornering powers Kf, Kr of the front and rear wheels are estimated based on the input data, steering angle δf, vehicle speed V and actual yaw rate γ according to the aforementioned adaptive control theory. The friction coefficients of the road surface are calculated from the ratios of the estimated cornering powers Kf, Kr to the equivalent cornering powers, Kf0, Kr0 on the road with a high friction coefficient (μ=1.0). Further, in order to avoid trouble such that the estimated cornering powers of the front wheels become extremely small when the front wheels are in a drift state, namely when the vehicle would not turn even with a turned steering wheel, or estimated cornering powers of the rear wheels become too small when the vehicle is spinning, a larger friction coefficient is chosen as an estimated friction coefficient E of the road surface from among the friction coefficients of the front and rear wheels.

Further, in target yaw rate determining means 52, the target yaw rate γt is determined based on the input data, steering angle δf and vehicle speed V. The target yaw rate δt and the actual yaw rate γ are inputted to target steering characteristics determining means 53 where the target stability factor At of the steering characteristic is determined and corrected in accordance with the difference between both yaw rates γt and γ. Incidentally, the stability factor is determined so as to have a characteristic of slightly weak under-steer in average vehicles. Thus, when the vehicle spins or drifts out, the stability factor At is established numerically according to the change of the actual yaw rate γ.

On the other hand, in input torque estimating means 54; an engine output power Te is estimated from the input data, engine speed N and accelerator pedal opening angle φ and an input torque Ti of the center differential is calculated by multiplying the estimated engine power Te by a gear ratio g at the gear position P.

The data, vehicle speed V, actual yaw rate γ, input torque Ti, target stability factor At and estimated friction coefficient E are inputted to torque distribution ratio calculating means 55 where the torque distribution ratio α between the front and rear wheels is calculated by using the aforementioned equations. The torque distribution ratio α and the input torque Ti are inputted to differential limiting torque calculating means 56 where a center differential limiting torque Tc is calculated according to the following equation:

$$Tc = (\alpha - Di) \cdot Ti$$

where Di is a reference torque distribution ratio determined by the combination of planetary gears of the center differential 20 as described before. In this embodiment, the weight distribution between the front and rear wheels is biased on the rear wheels. If the weight distribution is biased on the front wheels, the above equation is changed as follows:

$$Tc = (Di - \alpha) \cdot Ti$$

In these equations, if the calculated center differential limiting torque Tc is negative, Tc is allowed to be 0. The torque Tc thus calculated is converted into a torque signal in center differential limiting torque calculating means 56 and the torque signal is inputted to duty ratio converting means 57 wherein it is converted into a specified duty ratio D and this duty ratio is outputted to the solenoid valve 40.

Next, an operation of this embodiment will be described.

First, the power of the engine 1 is inputted to the transmission through the clutch 2 and the converted power is inputted to the first sun gear 21 of the center differential 20. As described before, since the reference torque distribution ratio et has been set being biased on the rear wheels, the power is outputted to the carrier 24 and the second sun gear 22 with this torque distribution ratio. Further, when the center clutch 27 is released (disengaged), the power is transmitted to the front and rear wheels with this distribution ratio et. As a result, the vehicle has a driving performance like that of a front engine-rear drive vehicle. Further, since the center differential 20 is free, the vehicle can be turned freely while the rotational difference between the front and rear wheels is absorbed therein. Here, when the duty signal is outputted from the control unit 50 to the solenoid valve 40, the differential limiting torque Tc is produced by hydraulic control means 32. The torque Tc bypasses across the second sun gear and the carrier 24 and is transferred towards the front wheels. As a result of this, a greater amount of the torque is distributed to the front wheels than to the rear wheels, whereby the torque distribution biased on the front wheels is obtained.

While the vehicle is running, signals of the steering angle δf, the vehicle speed V and the actual yaw rate γ are inputted to the control unit 50 and the vehicle behavior is always watched. When the vehicle is running on the road with a high friction coefficient of road surface, the actual yaw rate γ coincides approximately with the target yaw rate γt which is determined based upon the steering angle ιf and the vehicle speed V by the target yaw rate determining means 52. As a result, the stability factor At is set at a weak under-steer side and the steering characteristic of the vehicle is always retained in a weak under-steer.

The estimated friction coefficients E calculated by the road friction estimating means 51 is transmitted to the torque distribution ratio calculating means 55 in which the torque distribution ratio α is calculated based on the data, this calculated friction coefficients E, the vehicle speed V, the actual yaw rate γ, the stability factor At and the input torque Ti.

In a straight ahead operation of the vehicle, the torque distribution ratio α is determined primarily based on the input torque Ti and the estimated longitudinal acceleration Gx'.

On the other hand, when the vehicle is turning corners, the torque distribution ratio α is determined primarily based on the vehicle speed V and the estimated lateral acceleration Gy' determined by the actual yaw rate γ. Since the actual yaw rate γ is subjected to the feedback control, the control system according to the present invention is not affected by disturbances or control errors.

Next, when the vehicle is turning on the road with a low friction coefficient of road surface, if the torque is distributed more to the rear wheels than to the front wheels, first the lateral force of tire is decreased at the rear wheel side due to an excessive traction of the rear wheels and resultantly the rear wheels slip in the lateral direction. Eventually, when the tire grip exceeds a limit and the vehicle starts spinning, in the road friction estimating means 51 the cornering powers Kf, Kr of the front and rear wheels are estimated based on the steering angle δf, the vehicle speed V and the actual yaw rate γ in response to the vehicle behavior. Further, for each of the front and rear wheels the friction coefficient of the road surface is calculated by comparing it with a the one of the road with high friction coefficient and the highest one is selected from among friction coefficients thus calculated. This highest friction coefficient is the estimated friction coefficient E.

Further, in target steering characteristic determining means 53 the target stability factor At is determined according to the formula 15 described before based on the yaw rate gain Gγ determined by the yaw rate gain determining means 58 and on the deviation Δγ of the actual yaw rate γ from the target yaw rate γt determined by the target yaw rate determining means 52. For example, when the actual yaw rate becomes larger than the target yaw rate as a result of vehicular spin, the target stability factor At becomes larger than the reference target stability factor AtO, namely the target stability factor At is changed in the direction of strengthening under-steer. Then, in the torque distribution ratio calculating means 55 the torque distribution ratio α is calculated and controlled being biased on the front wheels and as a result of this the lateral force of the rear wheels increases, whereby the vehicle is prevented from spinning. Thus, the feedback control is performed through the target stability factor At such that the actual yaw rate coincides with the target yaw rate and accordingly the vehicle behavior is always kept at a favorable weak under-steer.

Next, the torque distribution control between left and right wheels will be described hereinafter. In this embodiment, as an example of the control between left and right wheels the torque distribution control between the rear-left and rear-right wheels will be explained.

The torque distribution control system according to this embodiment is based on the following principle:

When a rear differential limiting torque Td increases during a high speed turn with an accelerator pedal released, the braking force of the outer rear wheel becomes larger than that of the inner rear wheel and, as a result, the difference of these braking forces generates a moment M for intending to drive the vehicle straight ahead. It is known that this moment M is effective for preventing a tack-in of the vehicle. On the other hand, a magnitude of tack-in can be judged from the deviation of the actual yaw rate γ from the target yaw rate γt which a vehicle driver determines according to the vehicle speed V and the steering angle δf during turning. Where the numerated magnitude of tack-in is identified as a variation of the stability factor, the tack-in can be prevented by generating a yaw moment M so as to cancel this variation of the stability factor. That is to say, in order to prevent the tack-in, the rear differential limiting torque Td should be determined so as to generate the yaw moment M.

First, the target yaw rate γt will be determined as follows.

Figure 7:
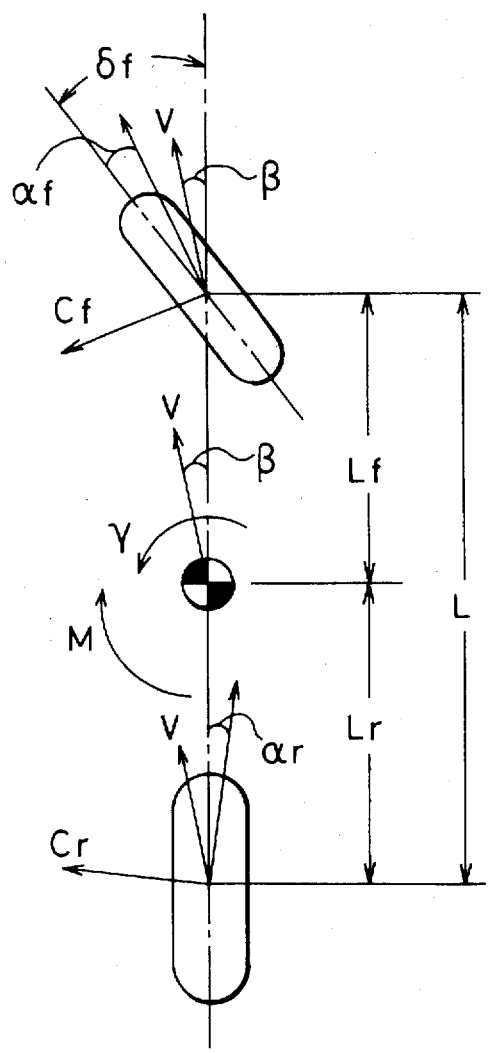
FIG. 7 is a diagram showing a two-wheel vehicle model in turning motion.

In a two-wheels vehicle model as shown in FIG. 7, equations of motion are expressed as:

$$mv(\dot{\beta}+\gamma)=Cf+Cr \qquad \text{(Formula 16)}$$

$$I\dot{\gamma}=LfCf-LrCr$$

where γ is an actual yaw rate, β is a slip angle of the vehicle, V is a vehicle speed (V is constant), m is vehicle mass, I is a yaw moment of inertia, Cf, Cr is a cornering force of the front and rear wheels respectively, Lf, Lr is a distance between the center of gravity and an axis of the front and rear wheels respectively.

The relationship between the cornering force and the slip angle of tire in the linear region is expressed as $Cf=2\,Kf\cdot\alpha f$, $Cr=2\,Kr\cdot\alpha r$, where Kf, Kr is an equivalent cornering power of the front and rear wheels respectively and αf, αr is a slip angle of tire of the front and rear wheels respectively.

Introducing the above relationship into the equations (Formula 16), the equations of motion are further expressed as:

(Formula 17)

$$mv\dot{\beta} + 2(Kf+Kr)\beta + \{mv + 2(LfKf-LrKr)/V\}\gamma = 2Kf\delta f + 2Kr\delta r$$

$$2(LfKf-LrKr)\beta + I\dot{\gamma} + \{2(Lf^2Kf+Lr^2Kr)/V\}\gamma = 2LfKf\delta f - 2LrKr\delta r$$

Based on the above fundamental equations of vehicular motion, the target yaw rate γt is obtained.

Next, it will be explained how the yaw moment M and the rear differential limiting torque Td are calculated.

When the rear differential limiting torque M is introduced into equations of motion of the two-wheels vehicle model shown in FIG. 7, they are expressed as:
(Formula 18)

$$mv(\dot{\beta}+\gamma)=Cf+Cr \qquad (1)$$

$$I\dot{\gamma}=LfCf-LrCr-M \qquad (2)$$

where γ is a yaw rate (variable), β is a slip angle of the vehicle (variable), m is a vehicle mass, V is a vehicle speed, Cf, Cr is a cornering force of the front and rear wheels respectively, I is a yaw moment of inertia, Lf, Lr is a distance between the center of gravity and an axis of the front and rear wheels respectively, M is a moment by the rear differential limiting torque.

The cornering force of the front and rear wheels is expressed respectively as follows:
(Formula 19)

$$Cf=2Kf\alpha f$$

$$Cr=2Kr\alpha r \qquad (3)$$

where Cf, Cr is a cornering force of the front and rear wheels respectively, Kf, Kr is a cornering power of the front and rear wheels respectively, αf, αr is a slip angle of tire of the front and rear wheels respectively.

Where the steering angles δf and δr are substituted into the tire slip angles αf and αr respectively, substitution of the equation (3) into the equations (1) and (2) gives the following formulas:

(Formula 20)

$$mv\dot{\beta} + 2(Kf + Kr)\beta + \{mv + 2(LfKf - LrKr)/V\}\gamma = 2Kf\delta f + 2Kr\delta r \quad (4)$$

$$2(LfKf - LrKr)\beta + I\dot{\gamma} + \{2(Lf^2Kf + Lr^2Kr)/V\}\gamma + M = 2LfKf\delta f - 2LrKr\delta r \quad (5)$$

Next, when the vehicle turns around a fixed circle the characteristic thereof will be explained. In this case, the slip angle $\beta$ of the vehicle and the yaw rate $\gamma$ are both constant and therefore deviations thereof are let to be zero. The equations (4) and (5) are expressed as follows:

(Formula 21)

$$2(Kf + Kr)\beta + \{mv + 2(LfKf - LrKr)/v\}\gamma = 2Kf\delta f \quad (6)$$

$$2(LfKf - LrKr)\beta + \{2(Lf^2Kf + Lr^2Kr)/v\}\gamma + M = 2LfKf\delta f \quad (7)$$

where the steering angle $\delta f$ of the rear wheel should be zero.

Here, the equation (7) of formula 21 is transformed into the following equation:
(Formula 22)

$$2(LfKf - LrKr)\beta + \{2(Lf^2Kf + Lr^2Kr)/v + M/\gamma\}\gamma = 2LfKf\delta f \quad (8)$$

The solution $\gamma$ is given by the equations (6) and (8) as follows:

(Formula 23)

$$\gamma = \left( \cfrac{1}{1 - \cfrac{m}{2L^2} \cdot \cfrac{LfKf - LrKr}{KfKr} V^2 + \cfrac{Kf + Kr}{2L^2 KfKr} \cdot M \cfrac{V}{\gamma}} \right) \cfrac{V}{L} \delta f \quad (9)$$

where L is a wheelbase (Lf+Lr), and $\gamma$ in the right side is a yaw rate previously obtained.

In order for the equation (9) to have a physical meaning, it is necessary to meet the following condition:

(Formula 24)

$$1 - \cfrac{m}{2L^2} \cdot \cfrac{LfKf - LrKr}{KfKr} V^2 + \cfrac{Kf + Kr}{2L^2 KfKr} \cdot M \cfrac{V}{\gamma} > 0 \quad (10)$$

Now introducing a stability factor A' extendedly applied to the vehicle with a rear differential limiting control, the following equation is given:

(Formula 25)

$$A' = A + \cfrac{Kf + Kr}{2L^2 KfKr} \cdot \cfrac{M}{V\gamma} \quad (11)$$

where A is a stability factor of a case where the rear differential limiting torque control is free.

Accordingly, when the yaw rate $\gamma$ is increased ($\Delta\gamma>0$) by tack-in, the deviation $\Delta A$ of the stability factor is expressed as:

(Formula 26)

$$\Delta A = \left( \cfrac{\delta f}{G\gamma \delta f + \Delta\gamma} - \cfrac{1}{G\gamma} \right)/LV$$

In the above equation, G$\gamma$ denotes a yaw rate gain of the steering angle $\delta f$ of the front wheel and the yaw rate gain is expressed as follows:

(Formula 27)

$$G\gamma = \left( \cfrac{1}{1 - \cfrac{m}{2L^2} \cdot \cfrac{LfKf - LrKr}{KfKr} V^2} \right) \cfrac{V}{L}$$

Consequently, the moment M necessary for canceling the tack-in is expressed as follows:

(Formula 28)

$$M = -\Delta A \cfrac{2L^2 KfKr V\gamma}{Kf + Kr}$$

Further, the rear differential limiting torque Td is given as:

$$Td = (M/d) \cdot R \quad \text{(Formula 19)}$$

where R is a diameter of tire, d is a tread.

Figure 6:
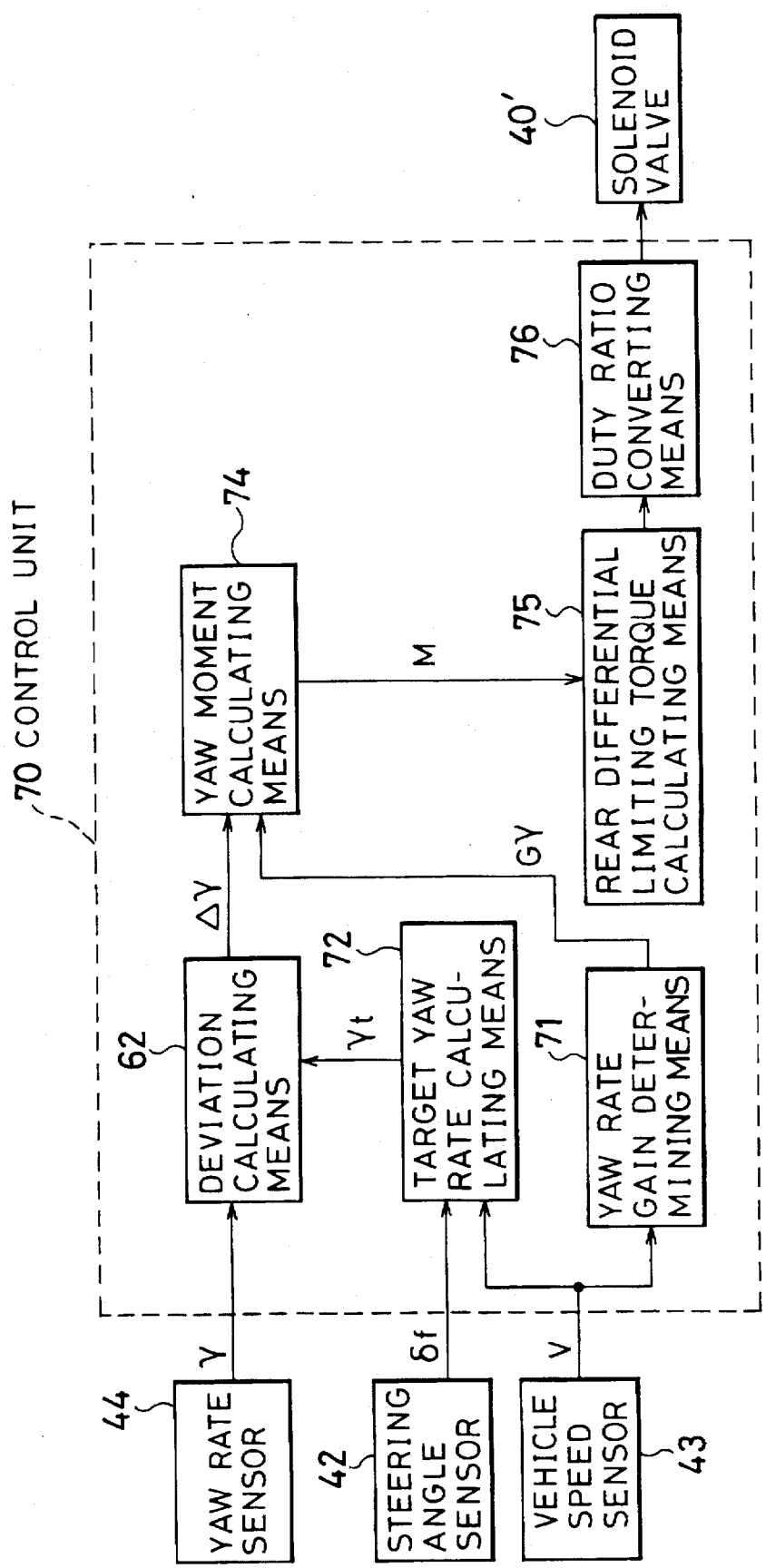
FIG. 6 is a block diagram showing means constituting the torque distribution control between rear-left and rear-right wheels of a vehicle according to the present invention.

Next, referring to FIG. 6, the function of the torque distribution control system will be described.

Signals of the yaw rate $\gamma$ detected by the yaw rate sensor 44, the steering angle $\delta f$ detected by the steering angle sensor 42 and the vehicle speed V detected by the vehicle speed sensor 43 are inputted to a control unit 70. In the control unit 70, there are provided yaw rate gain determining means 71 in which a yaw rate gain G7 of the predetermined steering angle $\delta f$ of the front wheel is determined from the aforementioned equations or by reading a map. The vehicle speed V and the steering angle $\delta f$ are inputted to target yaw rate calculating means 72 where a target yaw rate $\gamma t$ corresponding to the running condition on the high friction coefficient road is calculated based upon the aforementioned equations of motion. The dalculated target yaw rate $\gamma t$ and the actual yaw rate $\gamma$ are inputted to deviation calculating means 62 where the deviation $\Delta\gamma$ ($\Delta\gamma = \gamma - \gamma t$: $\Delta T > 0$) is calculated. Thus, a tuck-in is detected by an increase of the actual yaw rate $\gamma$ and further a magnitude of the tuck-in is obtained from the deviation $\Delta\gamma$.

The yaw rate gain G$\gamma$ and the yaw rate deviation $\Delta\gamma$ T corresponding to the magnitude of tack-in are inputted to yaw moment calculating means 74. In the yaw moment calculating means 74, first a deviation of the stability factor is obtained as $\Delta A$ by using the yaw rate gain G$\gamma$ and the yaw rate deviation $\Delta\gamma$. Since the stability factor is predetermined on the weak under-steer side, when a yaw rate deviation $\Delta\gamma$ is generated by tack-in, the deviation $\Delta A$ of the stability factor becomes a negative value (namely, on the oversteer side) according to the yaw rate deviation $\Delta\gamma$. Based on the calculated deviation $\Delta A$, finally a yaw moment M necessary for canceling the deviation $\Delta A$ is calculated.

The yaw moment M is inputted to rear differential limiting torque calculating means 75 where a rear differential limiting torque Td is calculated. Further, this torque signal Td is converted into a duty ratio D in duty ratio converting means 76 and then the duty signal D is outputted to the solenoid valve 40'.

The torque distributed by the center differential 20 and the center clutch 27 is transmitted to the rear differential 11. When the rear clutch 28 is released, the rear differential 11 distributes the driving force equally to the rear-left wheel 13L and the rear-right wheel 13R. Further, in this case, when the accelerator pedal is released, the braking force is also distributed equally. When the rear clutch 28 is engaged by the hydraulic control means 32', a differential limitting torque Td is generated in the rear clutch 28 and the torque distribution between the rear-left and rear-right wheels, 13L and 13R is changed by the differential limiting operation. That is to say, in a case where the driving force is applied, the torque is transferred from the high speed wheel to the low speed wheel (grip wheel) according to the rear differential limiting torque Td. On the other hand, in a case where the rotational speed of the outer wheel is larger than that of the inner wheel while the vehicle turns with the accelerator pedal released, the braking force is distributed more to the outer wheel than to the inner wheel according to the rear differential limiting torque Td.

During operation of the vehicle, signals of the steering angle δf, the vehicle speed V and the yaw rate γ are inputted to the control unit 70 and the vehicle behavior is always watched. When the vehicle behavior does not change while the vehicle runs straight ahead or turns corners, the target yaw rate γt which has been calculated from the steering angle δf and the vehicle speed V in the target yaw rate calculating means 72 coincides with the actual yaw rate γ and therefore the stability factor does not change. Accordingly, the rear differential limiting torque Td remains zero.

On the other hand, when the vehicle enters into a tack-in, namely, when the vehicle turns abruptly inside, while the vehicle turns at high speed with the accelerator pedal released, the actual yaw rate γ increases. Then, the deviation calculating means 73 calculates the deviation Δγ of the actual yaw rate γ from the target yaw rate γt and the magnitude of tack-in is detected. Further, in the yaw moment calculating means 74 this deviation Δγ is converted into the deviation ΔA of the stability factor and the yaw moment M for canceling this deviation ΔA is calculated therein.

Then, in the rear differential limiting torque calculating means 75, the rear differential limiting torque Td corresponding to the calculated yaw moment M is calculated and this torque Td is applied to the rear clutch 28. Thus, when the vehicle turns at high speed with the accelerator pedal released, according to this torque Td the braking torque is distributed more to the rear-outer wheel than to the the rear-inner wheel and as a result the moment M canceling the tack-in is generated so as to prevent the tack-in phenomenon. Further, since in the control system according to this embodiment a feedback control is perfomed such that the actual yaw rate γ coincides with the target yaw rate γt, the vehicle never goes to a strong under-steer side adversely and only tack-in phenomenon can be securely prevented. Further, since the control system is constituted such that the yaw rate deviation Δγ is converted into the deviation ΔA of the stability factor, the steering characteristic retains a weak under-steer as initially designed.

In this embodiment of the torque distribution control system, an example of the torque distribution control system between the rear-left and rear-right wheel has been described. However, fundamental features of the control system can be applied to a torque distribution control system between front-left and front-right wheel.

Figure 4:
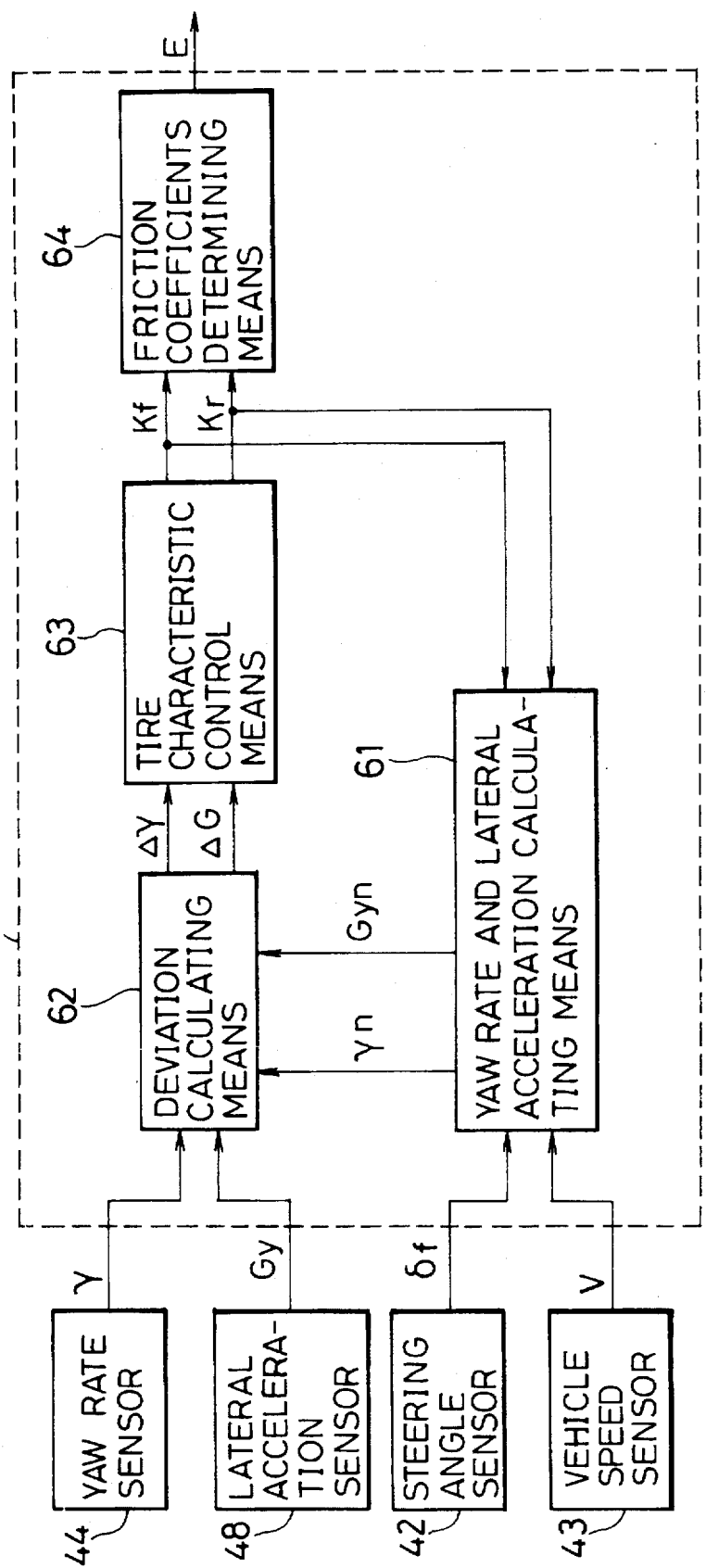
FIG. 4 is a block diagram showing means for estimating a friction coefficient of the road surface according to a second embodiment of the present invention.

Referring to FIG. 4, a second embodiment according to the present invention will be described. The second embodiment according to the present invention is another example of the friction coefficients estimating means 51.

The principle of the second embodiment is based on estimating the cornering power of the front and rear wheels by extending the cornering power to a non-linear region according to the adaptive control theory whose variables comprise a deviation of lateral acceleration and a deviation of actual yaw rate. That is to say, in the adaptive observation system constituting the steering angle, the vehicle speed and the estimated cornering power, the cornering power is estimated by extending the yaw rate and the lateral acceleration to the non-linear region on the base of the vehicular motion model in the linear region.

The vehicle speed V detected by the vehicle speed sensor 43 the steering angle δf detected by the steering angle sensor 42, the yaw rate γ detected by the yaw rate sensor 44 and the lateral acceleration Gy detected by the lateral acceleration sensor 48 are inputted to the friction coefficients estimating means 51. The friction coefficients estimating means 51 has yaw rate and lateral acceleration calculating means (adaptive observation system) 61 to which the steering angle δf, the vehicle speed V and the cornering power Kf, Kr of the front and rear wheels are inputted. In the yaw rate and lateral acceleration calculating means 61, a yaw rate γn and a lateral acceleration Gyn are calculated by using these parameters according to the vehicular motion model in the linear region. The calculated yaw rate γn, the calculated lateral acceleration Gyn, the detected yaw rate γ and the detected lateral acceleration Gy are inputted to deviation calculating means 62 in which a deviation Δγ of the calculated yaw rate γn from the detected yaw rate γ and a ΔG of the calculated lateral acceleration Gyn from the detected lateral acceleration Gy are calculated.

These deviations Δγ and ΔG are inputted to tire characteristic control means (adaptive controller) 63 where the cornering powers Kf, Kr of the front and rear wheels in a marginal behavior are estimated. Here, in a case where the actual lateral acceleration Gy is decreased and ΔG is positive, since it is judged that the vehicle is drifting out or spinning in the marginal area, both the cornering powers Kf and Kr should be reduced. On the other hand, in a case where ΔG is negative, since it is judged that the vehicle is in tuck-in, both Kf and Kr should be increased. In a case where the actual yaw rate γ is reduced and Δγ is positive, judging that the vehicle is drifting out, the cornering power Kf of the front wheels should be reduced and Kr of the rear wheels should be increased. In a case where the actual yaw rate γ is increased and Δγ is negative, judging that the vehicle is spinning, Kf of the front wheels should be increased and Kr of the rear wheels should be reduced. How the cornering powers Kf, Kr are corrected according to the state of both deviations Δγ, ΔG is summarized in the following Table 1:

TABLE 1

| Kf | Kr | |
|---|---|---|
| Reduce | Reduce | If ΔG > 0 |
| Increase | Increase | If ΔG < 0 |
| Reduce | Increase | If Δγ > 0 |
| Increase | Reduce | If Δγ < 0 |

As shown in FIG. 5, the cornering powers Kf, Kr corresponding to drift-out or spin of the vehicle in the marginal region are determined accurately every moment by reducing or increasing the cornering powers previously obtained by a predetermined increment according to the Table 1.

Thus estimated cornering powers Kf, Kr of the front and rear wheels are inputted to friction coefficients determining means 64 and the friction coefficient of the front and rear wheels are estimated respectively by comparing the estimated cornering powers with those of the high friction coefficient road in the same manner as in the first embodiment. The estimated friction coefficient E is a larger one among those friction coefficients estimated above.

In this second embodiment, the yaw rate and lateral acceleration calculating means 61 of the friction coefficients estimating means 51 calculate the yaw rate γn and the lateral acceleration Gyn based on the steering angle δf, the vehicle speed V, the estimated cornering powers Kf, Kr at the previous moment and the deviation calculating means 62 calculate the deviation Δγ of the actual yaw rate γ from the calculated yaw rate γn and the deviation ΔG of the actual lateral acceleration Gy from the calculated lateral acceleration Gyn. Further, the tire characteristic control means 63 estimate the cornering powers Kf, Kr at the present moment based on the correction of the cornering power according to the state of both deviations Δγ and ΔG. When the vehicle drifts out or spins on the low friction coefficient road, the vehicle behavior is detected as the deviation Δγ of yaw rate and the deviation ΔG of lateral acceleration and the cornering powers Kf, Kr of the front and rear wheels in a side-slip state can be estimated with further high accuracy.

In summary, the torque distribution control system according to the present invention provides a safe and comfortable driving under any conditions of the road or in a marginal state of behavior by properly distributing the driving torque among the wheels.

The torque distribution control mechanism between the front and rear wheels comprises friction coefficients estimating means for estimating a friction coefficient of road surface from cornering powers of the front and rear wheels, target yaw rate determining means for determining a target yaw rate according to the running condition of the vehicle on a high friction coefficient road based on a steering angle and a vehicle speed, target steering characteristic determining means for determining a target stability factor according to the difference between the target yaw rate and the actual yaw rate, input torque estimating means for estimating an input torque of the center differential, torque distribution ratio calculating means for calculating a torque distribution ratio between the front and rear wheels from equations of motion of the vehicle extended to a non-linear region, based on the vehicle speed, the actual yaw rate, the input torque, the estimated friction coefficient of road surface and the target stability factor, and center differential limiting torque calculating means for calculating a center differential limiting torque based on the torque distribution ratio between the front and rear wheels and the input torque.

In the constituted torque distributing control mechanism between the front and rear wheels, when the vehicle operates on a road with high friction coefficients, the torque is properly distributed between the front and rear wheels according to the running conditions of the vehicle such as a straight running and a cornering operation, whereby excellent maneuverability is given to the vehicle.

On the other hand, when the vehicle operates on a road with low friction coefficients, since a friction coefficient can be estimated with high accuracy and the torque distribution is properly distributed between the front and rear wheels, the vehicle can be prevented from spinning or drifting out.

The torque distributing mechanism between the rear-left and rear-right wheel according to the present invention comprises target yaw rate calculating means for calculating a target yaw rate from equations of vehicular motion based on the steering angle and the vehicle speed, deviation calculating means for calculating a deviation of the actual yaw rate from the target yaw rate according to the magnitude of the tack-in, yaw rate gain determining means for determining a yaw rate gain based on a predetermined map parameterizing the vehicle speed, yaw moment calculating means for calculating a yaw moment necessary for canceling the deviation of the stability factor which has been calculated from the above deviation of the actual yaw rate and the above yaw rate gain, and rear differential limiting torque calculating means for calculating a rear differential limiting torque according to the above yaw moment.

In the constituted torque distributing mechanism between the rear-left and the rear-right wheel, since the magnitude of the tack-in can be accurately detected, a rear differential limiting torque necessary for canceling the tack-in can be calculated. The calculated rear differential limiting torque generates a yaw moment, whereby a tack-in phenomenon of the vehicle can be prevented.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A torque distribution control system of a vehicle for distributing an input torque to wheels, comprising:

a yaw rate sensor for detecting a yaw rate;

a steering angle sensor for detecting a steering angle;

a vehicle speed sensor for detecting a vehicle speed; and road friction estimating means for estimating a friction coefficient of road surface based on said yaw rate, said steering angle and said vehicle speed;

torque distribution ratio calculating means for calculating a torque distribution ratio by using said friction coefficient; and a torque distributing mechanism for distributing said input torque to said wheels based on said torque distribution ratio.

2. The torque distribution control system according to claim 1, wherein said friction coefficient is estimated by comparing a cornering power of a wheel which has been calculated based on said steering angle, said vehicle speed and said yaw rate according to equations of motion of said vehicle with a reference cornering power of said wheel on a high friction coefficient road.

3. The torque distribution control system according to claim 1 is for the purpose of distributing said input torque between front and rear wheels.

4. A torque distribution control system of a vehicle for distributing an input torque to wheels, comprising:

a yaw rate sensor for detecting a yaw rate;

a steering angle sensor for detecting a steering angle;

a vehicle speed sensor for detecting a vehicle speed;

a lateral acceleration sensor for detecting a lateral acceleration;

road friction estimating means for estimating a friction coefficient of road surface based on said yaw rate, said steering angle, said vehicle speed and said lateral acceleration;

torque distribution ratio calculating means for calculating a torque distribution ratio by using said friction coefficient; and a torque distributing mechanism for distributing said input torque to said wheels based on said torque distribution ratio.

5. The torque distribution control system according to claim 4, wherein said road friction estimating means comprise yaw rate and lateral acceleration calculating means for calculating a yaw rate and a lateral acceleration according to equations of motion of said vehicle based on said steering angle, said vehicle speed and cornering powers, deviation calculating means for calculating a deviation of said detected yaw rate from said calculated yaw rate and a deviation of said detected lateral acceleration from said calculated lateral acceleration, tire characteristic control means for estimating cornering powers of wheels based on said deviation of said detected yaw rate and said deviation of said detected lateral acceleration and friction coefficients determining means for determining a friction coefficient of road surface based on said cornering powers and for outputting said friction coefficient to said torque distribution ratio calculating means so as to calculate said torque distribution ratio based on said friction coefficient.

6. The torque distribution control system according to claim 4 is for the purpose of distributing said input torque between front and rear wheels.

7. A torque distribution control system of a vehicle for distributing an input torque to wheels, comprising:

an engine speed sensor for detecting an engine speed;

an accelerator pedal opening angle sensor for detecting an accelerator pedal opening angle;

a gear position sensor for detecting a gear position;

a steering angle sensor for detecting a steering angle;

a vehicle speed sensor for detecting a vehicle speed;

a yaw rate sensor for detecting a yaw rate of said vehicle;

input torque estimating means for estimating said input torque based on said engine speed, said accelerator pedal angle and said gear position;

target yaw rate determining means for determining a target yaw rate based on said steering angle and said vehicle speed;

yaw rate gain determining means for determining a yaw rate gain based on said vehicle speed;

target steering characteristic determining means for determining a target stability factor based on said target yaw rate, said yaw rate, said vehicle speed and said yaw rate gain;

road friction estimating means for estimating a friction coefficient of road surface based on said steering angle, said vehicle speed and said yaw rate;

torque distribution ratio calculating means for calculating a torque distribution ratio based on said input torque, said target stability factor, said vehicle speed, said yaw rate and said friction coefficient; and a torque distributing mechanism for distributing said input torque to said wheels based on said torque distribution ratio.

8. A torque distribution control system of a vehicle for distributing an input torque to wheels, comprising:

a yaw rate sensor for detecting a yaw rate;

a steering angle sensor for detecting a steering angle;

a vehicle speed sensor for detecting a vehicle speed;

target yaw rate calculating means for calculating a target yaw rate based on said steering angle and said vehicle speed;

deviation calculating means for calculating a deviation of said yaw rate from said target yaw rate based on said yaw rate and said target yaw rate;

yaw rate gain determining means for determining a yaw rate gain based on said vehicle speed;

yaw moment calculating means for calculating a yaw moment based on said deviation of said yaw rate from said target yaw rate and on said yaw rate gain; and a torque distributing mechanism for distributing said input torque to said wheels according to said yaw moment.

9. The torque distribution control system according to claim 8 is for the purpose of distributing said input torque between left and right wheels.

10. A torque distribution control system of a vehicle for distributing an input torque to wheels, comprising:

an engine speed sensor for detecting an engine speed;

an accelerator pedal opening angle sensor for detecting an accelerator pedal opening angle;

a gear position sensor for detecting a gear position;

a steering angle sensor for detecting a steering angle;

a vehicle speed sensor for detecting a vehicle speed;

a yaw rate sensor for detecting a yaw rate of said vehicle;

a lateral acceleration sensor for detecting a lateral acceleration of said vehicle;

input torque estimating means for estimating an input torque based on said engine speed, said accelerator pedal angle and said gear position;

target yaw rate determining means for determining a target yaw rate based on said steering angle and said vehicle speed;

target steering characteristic determining means for determining a target stability factor based on said target yaw rate and said yaw rate;

road friction estimating means for estimating a friction coefficient of road surface based on said steering angle, said vehicle speed and said yaw rate;

torque distribution ratio calculating means for calculating a torque distribution ratio based on said input torque, said target stability factor, said vehicle speed, said yaw rate, said lateral acceleration and said friction coefficient; and a torque distributing mechanism for distributing said input torque to said wheels based on said torque distribution ratio.

11. A method of distributing an input torque to wheels of a vehicle, comprising the steps of:

detecting a yaw rate;

detecting a steering angle;

detecting a vehicle speed;

estimating a friction coefficient of road surface based on said yaw rate, said steering angle and said vehicle speed;

calculating a torque distribution ratio by using said friction coefficient; and distributing said input torque among said wheels based on said torque distribution ratio.

12. A method of distributing an input torque to wheels of a vehicle, comprising the steps of:

detecting a yaw rate;

detecting a steering angle;

detecting a vehicle speed;

detecting a lateral acceleration;

estimating a friction coefficient of road surface based on said yaw rate, said steering angle, said vehicle speed and said lateral acceleration;

calculating a torque distribution ratio by using said friction coefficient; and distributing said input torque to said wheels based on said torque distribution ratio.

13. A method of distributing an input torque to wheels, comprising the steps of:

detecting an engine speed;
   detecting an accelerator pedal opening angle;
   detecting a gear position;
   detecting a steering angle;
   detecting a vehicle speed;
   detecting a yaw rate of said vehicle;
   estimating said input torque based on said engine speed, said accelerator pedal angle and said gear position;
   determining a target yaw rate based on said steering angle and said vehicle speed;
   determining a yaw rate gain based on said vehicle speed;
   determining a target stability factor based on said target yaw rate, said yaw rate, said vehicle speed and said yaw rate gain;
   estimating a friction coefficient of road surface based on said steering angle, said vehicle speed and said yaw rate;
   calculating a torque distribution ratio based on said input torque, said target stability factor, said vehicle speed, said yaw rate and said friction coefficient; and
   distributing said input torque to said wheels based on said torque distribution ratio.

14. A method of distributing an input torque to wheels of a vehicle, comprising the steps of:

detecting a yaw rate;
   detecting a steering angle;
   detecting a vehicle speed;
   calculating a target yaw rate based on said steering angle and said vehicle speed;
   calculating a deviation of said yaw rate from said target yaw rate based on said yaw rate and said target yaw rate;
   determining a yaw rate gain based on said vehicle speed;
   calculating a yaw moment based on said deviation of said yaw rate from said target yaw rate and on said yaw rate gain; and
   distributing said input torque to said wheels according to said yaw moment.

15. A method of distributing an input torque to wheels of a vehicle, comprising the steps of:

detecting an engine speed;
   detecting an accelerator pedal opening angle;
   detecting a gear position;
   detecting a steering angle;
   detecting a vehicle speed;
   detecting a yaw rate of said vehicle;
   detecting a lateral acceleration of said vehicle;
   estimating said input torque based on said engine speed, said accelerator pedal angle and said gear position;
   determining a target yaw rate based on said steering angle and said vehicle speed;
   determining a target stability factor based on said target yaw rate and said yaw rate;
   estimating a friction coefficient of road surface based on said steering angle, said vehicle speed and said yaw rate;
   calculating a torque distribution ratio based on said input torque, said target stability factor, said vehicle speed, said yaw rate, said lateral acceleration and said friction coefficient; and
   distributing said input torque to said wheels based on said torque distribution ratio.

16. A torque distribution control system of a vehicle having, a center clutch for distributing a torque from an engine to a front and a rear wheel respectively, input torque estimating means for estimating an input torque based on engine operating conditions and for producing an input signal, a steering angle sensor for detecting a steering angle and for generating a steering angle signal, a vehicle speed sensor for detecting a vehicle speed and for producing a vehicle speed signal, a yaw rate sensor for detecting a yaw rate of said vehicle and for outputting a yaw rate signal, comprising:

target yaw rate determining means responsive to said steering angle and said vehicle speed signals;
   yaw rate gain determining means responsive to said vehicle speed signal for determining a yaw rate gain and for generating a yaw rate gain signal;
   road friction estimating means responsive to said yaw rate signal, said vehicle speed signal and said steering angle signal for estimating a friction coefficient of road surface and for outputting a friction coefficient signal;
   torque distribution ratio calculating means responsive to said input torque, said target stability factor, said vehicle speed, said yaw rate and said friction coefficient signals for calculating a torque distribution ratio and for producing a torque distribution ratio signal;
   torque distribution ratio calculating means responsive to said torque distribution ratio signal and said input torque signal for calculating a torque distribution ratio by using a friction coefficient and for producing a torque signal; and
   a torque distributing mechanism responsive to said torque signal for distributing said input torque to said respective wheels based on said torque distribution ratio so as to prevent said vehicle from a tack-in phenomenon.

17. A torque distribution control system of a four-wheel drive vehicle for distributing engine torque to each wheel of the vehicle having an engine mounted on said vehicle, a transmission connected to said engine via a clutch for changing engine speed, a center differential operatively and mechanically connected to said engine and said wheels and for absorbing a speed difference between front wheels and rear wheels thereof, a solenoid valve operatively and hydraulically connected to said center differential, an engine speed sensor for detecting said engine speed and for generating an engine speed signal, a throttle sensor for detecting an opening degree of a throttle valve and for producing a throttle signal, a gear position sensor mounted on said transmission for detecting a gear position thereof and for producing a gear position signal, a steering sensor mounted on said vehicle for sensing a steering angle of said front wheels and for generating a steering angle signal, a vehicle speed sensor mounted on said vehicle for detecting vehicle speed and for producing a vehicle speed signal, and a yaw rate sensor mounted on said vehicle for detecting an actual yaw rate of said vehicle and for generating an actual yaw rate signal, comprising:

torque estimating means responsive to said engine speed signal, said throttle signal and said gear position signal for calculating an input torque to said center differential by estimating an outputted torque of said engine by referring to an engine output characteristic map stored in a memory and for producing an input torque signal;
   target yaw rate determining means responsive to said steering angle signal and said vehicle speed signal for setting a target yaw rate based upon a standard turning characteristic corresponding to a friction coefficient of a road surface and for producing a target yaw rate signal;

road friction estimating means responsive to said steering angle signal, said vehicle speed signal and said actual yaw rate signal for setting a predetermined value of a friction coefficient corresponding to a road condition by using a predetermined equation of motion of said vehicle and for producing an estimated friction signal;

target steering characteristic setting means responsive to said target yaw rate signal and said actual yaw rate signal for setting a target stability factor in accordance with a deviation between said actual yaw rate and said target yaw rate and for outputting a target steering characteristic signal;

torque distribution ratio calculating means responsive to said input torque signal, said target steering characteristic signal, said vehicle speed signal, said actual yaw rate signal and said estimated friction signal for calculating a torque distribution ratio and for generating a torque distribution ratio signal; and duty ratio deciding means responsive to said input torque signal and said torque distribution ratio signal for calculating a limiting torque of said center differential by a predetermined equation in relation with a standard torque distribution ratio and for transmitting an operating signal to said solenoid valve so as to perform an optimum control of said vehicle and to improve stability and driveability when said vehicle is negotiating a tight corner on a slippery road.

18. The torque distribution control system according to claim 17, wherein:

said road friction estimating means produces said estimated friction signal by selecting a higher friction coefficient from those of said front and rear wheels.

19. The torque distribution control system according to claim 17, wherein:

said target steering characteristic setting means changes said target stability factor in accordance with said deviation between said actual yaw rate and said target yaw rate.

20. A torque distribution control system of a four-wheel drive vehicle for distributing engine torque to each wheel of the vehicle having an engine mounted on said vehicle, a transmission connected to said engine via a clutch for changing engine speed, a center differential operatively and mechanically connected to said engine and said wheels and for absorbing a speed difference between front wheels and rear wheels thereof, a solenoid valve operatively and hydraulically connected to said center differential, an engine speed sensor for detecting said engine speed and for generating an engine speed signal, a throttle sensor for detecting an opening degree of a throttle valve and for producing a throttle signal, a gear position sensor mounted on said transmission for detecting a gear position thereof and for producing a gear position signal, a steering sensor mounted on said vehicle for sensing a steering angle of said front wheels and for generating a steering angle signal, a vehicle speed sensor mounted on said vehicle for detecting vehicle speed and for producing a vehicle speed signal, a yaw rate sensor mounted on said vehicle for detecting an actual yaw rate of said vehicle and for generating an actual yaw rate signal, and a lateral G-sensor mounted on said vehicle for detecting a lateral acceleration of said vehicle and for outputting an actual lateral acceleration signal, comprising:

torque estimating means responsive to said engine speed signal, said throttle signal and said gear position signal for calculating an input torque to said center differential by estimating an outputted torque of said engine by referring to an engine output characteristic map stored in a memory and for producing an input torque signal;

target yaw rate determining means responsive to said steering angle signal and said vehicle speed signal for setting a target yaw rate based upon a standard turning characteristic corresponding to a friction coefficient of a road surface and for producing a target yaw rate signal;

calculating means responsive to said steering angle signal and said vehicle speed signal and for calculating a yaw rate and a lateral acceleration with a vehicular motion model equation and for producing a calculated yaw rate signal and a calculated lateral acceleration signal;

deviation calculating means responsive to said actual yaw rate signal, said actual lateral acceleration signal, and said calculated yaw rate signal and said calculated lateral acceleration signal for deriving a yaw rate deviation value of said calculated yaw rate signal from said actual yaw rate signal and a lateral acceleration deviation value of said calculated lateral acceleration signal from said actual lateral acceleration signal and for producing a deviation signal;

tire characteristic control means responsive to said deviation signal for deriving a cornering power of both said front and rear wheels and for generating a cornering power characteristic signal;

road friction estimating means responsive to said cornering power characteristic signal for setting a predetermined value of a friction coefficient corresponding to a road condition by using a predetermined equation of motion of said vehicle and for producing an estimated friction signal;

target steering characteristic setting means responsive to said target yaw rate signal and said actual yaw rate signal for setting a target stability factor in accordance with a deviation between said actual yaw rate and said target yaw rate and for outputting a target steering characteristic signal;

torque distribution ratio calculating means responsive to said input torque signal, said target steering characteristic signal, said vehicle speed signal, said actual yaw rate signal and said estimated friction signal for calculating a torque distribution ratio and for generating a torque distribution ratio signal; and duty ratio deciding means responsive to said input torque signal and said torque distribution ratio signal for calculating a limiting torque of said center differential by a predetermined equation in relation to a standard torque distribution ratio and for transmitting an operating signal to said solenoid valve so as to perform an optimum control of said vehicle and to improve stability and driveability when said vehicle is negotiating a tight corner on a slippery road.

21. A torque distribution control system of a four-wheel-drive vehicle for distributing an engine torque to each wheel of the vehicle having an engine mounted on said vehicle, a transmission connected to said engine via a clutch for changing engine speed, a center differential operatively and mechanically connected to said engine and said wheels for absorbing a speed difference between front wheels and rear wheels thereof, a rear differential operatively and mechanically interposed between a left rear wheel of said wheels, and a right rear wheel of said wheels for absorbing a left and right rear wheel speed difference, a rear solenoid valve operatively and hydraulically connected to said rear differential, a steering sensor mounted on said vehicle for sensing a steering angle of said front wheels and for generating a steering angle signal, a vehicle speed sensor mounted on said vehicle for detecting vehicle speed and for producing a vehicle speed signal, and a yaw rate sensor mounted on said vehicle for detecting an actual yaw rate of said vehicle and for generating an actual yaw rate signal, comprising:

- target yaw rate determining means responsive to said steering angle signal and said vehicle speed signal for setting a target yaw rate based upon a standard turning characteristic corresponding to a friction coefficient of a road surface and for producing a target yaw rate signal;
- calculating means responsive to said steering angle signal and said vehicle speed signal and for calculating a yaw rate with a vehicular motion model equation and for producing a calculated yaw rate signal;
- deviation calculating means responsive to said actual yaw rate signal and said calculated yaw rate signal for deriving a yaw rate deviation value of said calculated yaw rate signal from said actual yaw rate signal and for producing a deviation signal;
- yaw rate gain setting means responsive to said vehicle speed for determining a yaw rate gain corresponding to a present vehicle speed by referring to a yaw rate gain map and outputting a yaw rate gain signal;
- yaw moment calculating means responsive to said deviation signal and said yaw rate gain signal for deriving a yaw moment by using a predetermined moment equation of said vehicle and for producing a moment signal; and
- rear differential control means responsive to said moment signal for calculating a limiting torque of said rear differential by a predetermined equation to transmit an operating signal to said rear solenoid valve so as to perform optimum control of said vehicle by distributing torque to said left and right rear wheels and to improve stability and driveability when said vehicle is negotiating a tight corner on a slippery road.

22. A torque distribution control method of a four-wheel-drive vehicle for distributing engine torque to each wheel of the vehicle having an engine mounted on said vehicle, a transmission connected to said engine via a clutch for changing engine speed, a center differential operatively and mechanically connected to said engine and said wheels for absorbing a speed difference between front wheels and rear wheels thereof, a solenoid valve operatively and hydraulically connected to said center differential, the method comprising the steps of:

sensing an engine speed;
detecting an opening degree of a throttle valve;
indicating a gear position of said transmission;
measuring a steering angle of said front wheels;
calculating vehicle speed;
deriving an actual yaw rate of said vehicle;
computing an input torque from detected values of said engine speed, said opening degree of said throttle valve and said gear position to said differential by reference to an engine output characteristic map stored in a memory;
first determining a target yaw rate from said steering angle and said vehicle speed by using a standard turning characteristic corresponding to a friction coefficient of a road surface;
secondly determining a predetermined value of a friction coefficient corresponding to a road condition from said steering angle, said vehicle speed, and said actual yaw rate by using a predetermined equation of motion of said vehicle;
determining a target stability factor in accordance with a deviation between said actual yaw rate and said target yaw rate;
deriving a torque distribution ratio from values of said input torque, said target stability factor, said vehicle speed, said yaw rate and said predetermined friction coefficient;
calculating a limiting torque of said center differential from said torque distribution ratio and said input torque by a predetermined equation in relation to a standard torque distribution ratio; and
determining and transmitting an operating signal based on said calculated limiting torque to said solenoid valve so as to perform optimum control of said vehicle and to improve stability and driveability when said vehicle is negotiating a tight corner on a slippery road.

23. The torque distribution control method according to claim 22, wherein:

said secondly determining step further comprises producing said estimated friction signal by selecting a higher friction coefficient from those of said front and rear wheels.

24. The torque distribution control method according to claim 22, wherein:

said first determining step further comprises changing said target stability factor in accordance with said deviation between said actual yaw rate and said target yaw rate.

25. A torque distribution control method of a four-wheel-drive vehicle for distributing engine torque to each wheel of the vehicle having an engine mounted on said vehicle, a transmission connected to said engine via a clutch for changing engine speed, a center differential operatively and mechanically connected to said engine and said wheels for absorbing a speed difference between front wheels and rear wheels thereof, a solenoid valve operatively and hydraulically connected to said center differential, the method comprising the steps of:

sensing an engine speed;
detecting an opening degree of a throttle valve;
indicating a gear position of said transmission;
measuring a steering angle of said front wheels;
calculating a vehicle speed;
deriving an actual yaw rate of said vehicle,
detecting an actual lateral acceleration of said vehicle by a lateral G-sensor mounted on said vehicle;
computing an input torque from detected values of said engine speed, said opening degree of said throttle valve and said gear position by referring to an engine output characteristic map stored in a memory;
determining a target yaw rate from said steering angle and said vehicle speed by using a standard turning characteristic corresponding to a friction coefficient of a road surface;
calculating a yaw rate and a lateral acceleration from said steering angle and said vehicle speed by making use of a vehicular motion model equation;

calculating a yaw rate deviation value of said calculated yaw rate from said actual yaw rate and a lateral acceleration deviation value of said calculated lateral acceleration from said actual lateral acceleration;

calculating a tire characteristic from said yaw rate and acceleration deviation values representing a cornering power of both said front and rear wheels;

calculating a predetermined value of a friction coefficient corresponding to a road condition by using a predetermined equation of motion of said vehicle;

calculating a target steering characteristic of a target stability factor in accordance with a deviation between said actual yaw rate and said target yaw rate;

calculating a torque distribution ratio from values of said input torque, said target steering characteristic, said vehicle speed, said actual yaw rate and said estimated friction;

calculating a duty ratio of a limiting torque of said center differential from said calculated torque distribution ratio and said input torque by a predetermined equation in relation to a standard torque distribution ratio to transmit an operating signal to said solenoid valve so as to perform optimum control of said vehicle and to improve stability and driveability when said vehicle is negotiating a tight corner on a slippery road.

26. A torque distribution control method of a four-wheel-drive vehicle for distributing an engine torque to each wheel of the vehicle having an engine mounted on said vehicle, a transmission connected to said engine via a clutch for changing engine speed, a center differential operatively and mechanically connected to said engine and said wheels for absorbing a speed difference between front wheels and rear wheels thereof, a rear differential operatively and mechanically interposed between the left rear wheel and a right rear wheel of said wheels for absorbing a left and right rear wheel speed difference, and a rear solenoid valve operatively and hydraulically connected to said rear differential, the method comprising the steps of:

sensing a steering angle of said front wheels;

detecting vehicle speed;

detecting an actual yaw rate of said vehicle;

setting a target yaw rate based upon a standard turning characteristic corresponding to a friction coefficient of a road surface from said sensed steering angle and said detected vehicle speed;

calculating a yaw rate from said sensed steering angle and said vehicle speed with a vehicular motion model equation;

deriving a yaw rate deviation value of said calculated yaw rate from said actual yaw rate from said actual yaw rate and said calculated yaw rate;

determining a yaw rate gain corresponding to a present vehicle speed by referring to a yaw rate gain map from said detected vehicle speed;

deriving a yaw moment by using a predetermined moment equation of said vehicle from said derived deviation and said yaw rate gain; and calculating a limiting torque of said rear differential from said yaw moment by a predetermined equation and transmitting an operating signal to said rear solenoid valve so as to perform optimum control of said vehicle by distributing torque to the left and right rear wheels and to improve stability and driveability when said vehicle is negotiating a tight corner on a slippery road.

* * * * *